Figure 1:
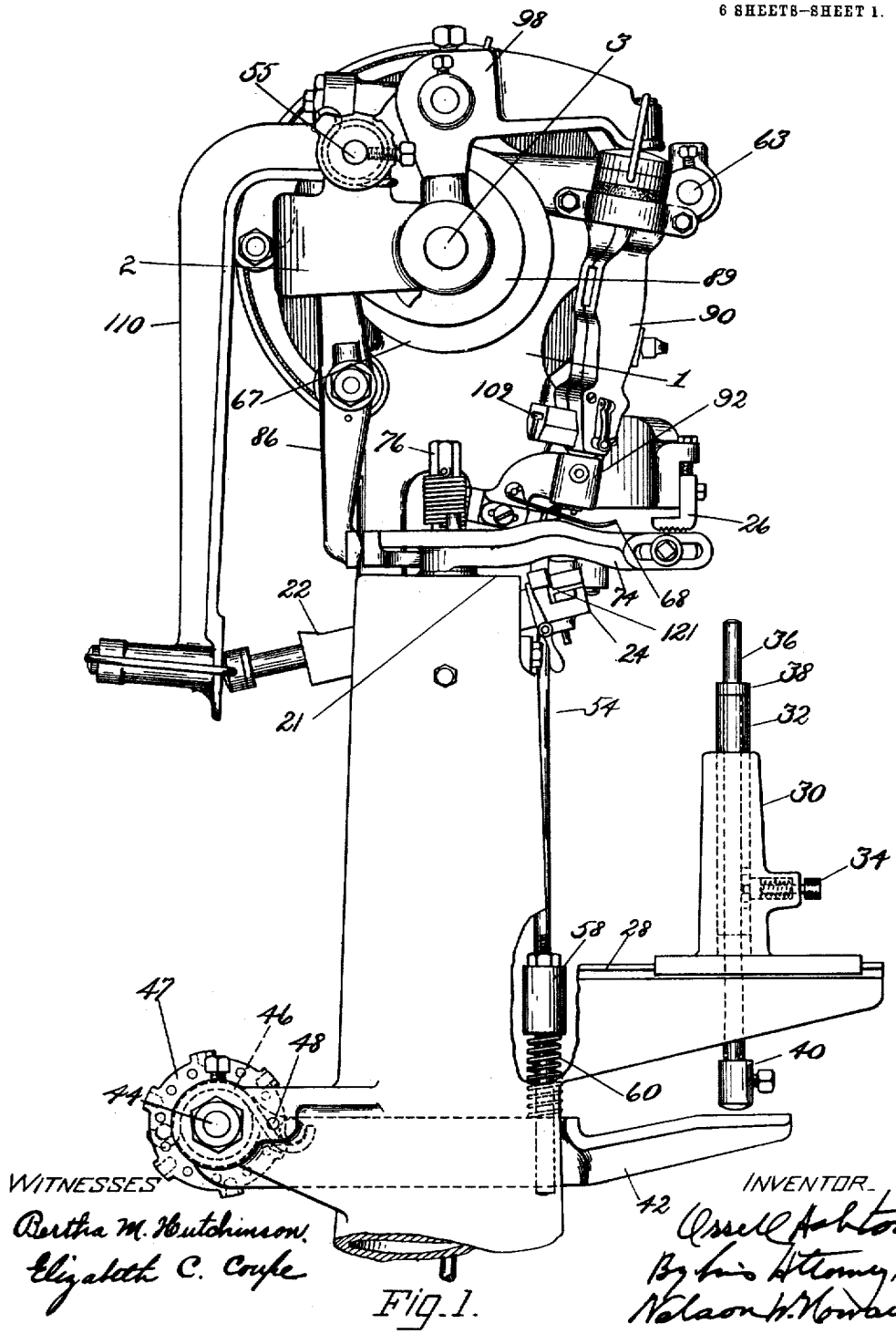

O. ASHTON.
MACHINE FOR ASSEMBLING PARTS OF BOOTS AND SHOES.
APPLICATION FILED AUG. 15, 1906.

1,023,794.

Patented Apr. 23, 1912.

6 SHEETS—SHEET 1.

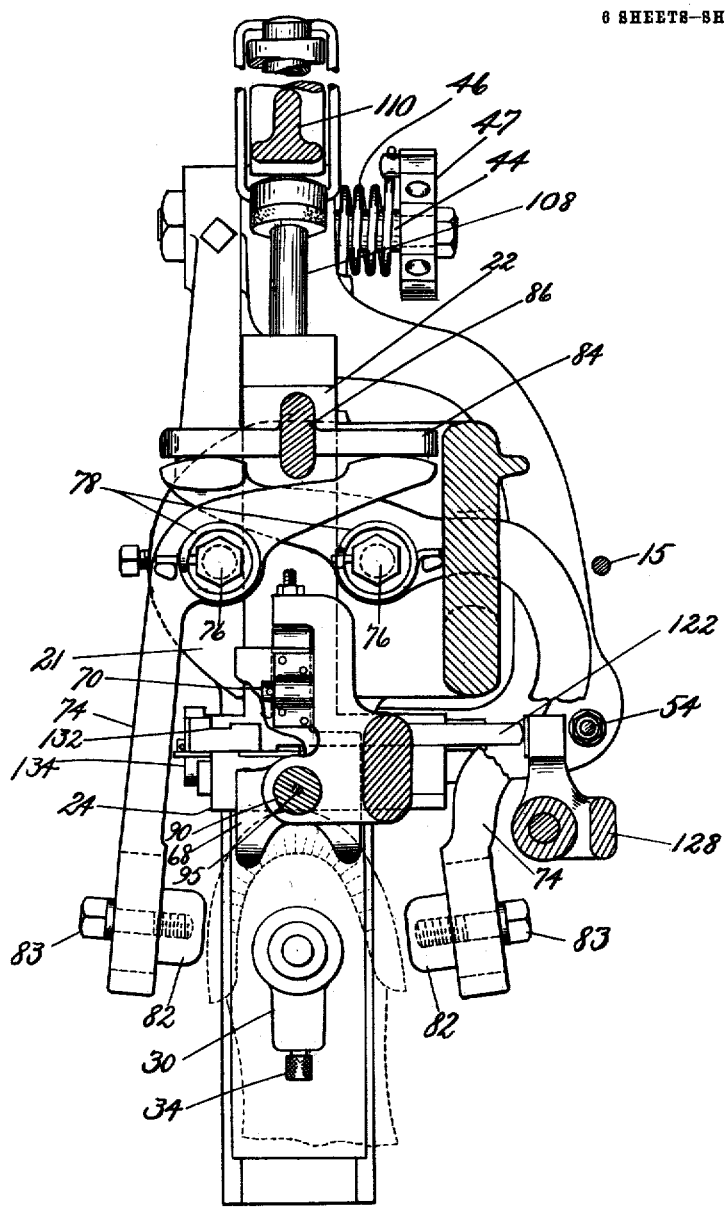

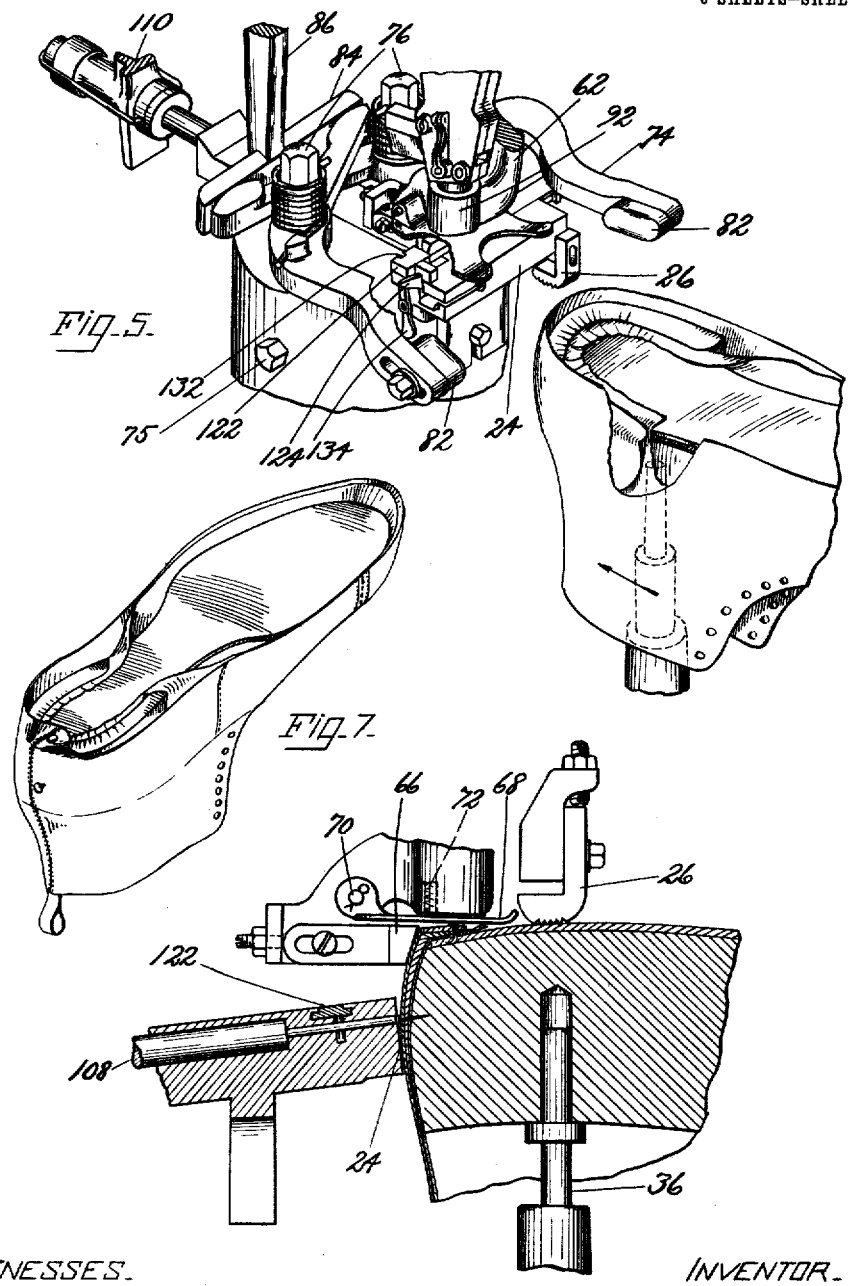

O. ASHTON.
MACHINE FOR ASSEMBLING PARTS OF BOOTS AND SHOES.
APPLICATION FILED AUG. 15, 1906.

1,023,794.  Patented Apr. 23, 1912.
6 SHEETS—SHEET 6.

WITNESSES.
Bertha M. Hutchinson.
Elizabeth C. Coupe

INVENTOR.
Orrel Ashton
By his Attorney
Nelson W. Howard

UNITED STATES PATENT OFFICE.

ORRELL ASHTON, OF LAWRENCE, MASSACHUSETTS, ASSIGNOR TO UNITED SHOE MACHINERY COMPANY, OF PATERSON, NEW JERSEY, A CORPORATION OF NEW JERSEY.

MACHINE FOR ASSEMBLING PARTS OF BOOTS AND SHOES.

1,023,794.  Specification of Letters Patent.  Patented Apr. 23, 1912.

Application filed August 15, 1906. Serial No. 330,705.

*To all whom it may concern:*

Be it known that I, ORRELL ASHTON, a citizen of the United States, residing at Lawrence, in the county of Essex and Commonwealth of Massachusetts, have invented certain Improvements in Machines for Assembling Parts of Boots and Shoes, of which the following description, in connection with the accompanying drawings, is a specification, like reference characters on the drawings indicating like parts in the several figures.

This invention relates to machines for assembling parts of boots and shoes, preliminary to pulling-over and lasting their uppers.

In the manufacture of boots and shoes, the parts of a boot or shoe which are secured upon the last in the pulling-over and the lasting operations are commonly prepared for these operations by being assembled and fastened together at the heel. According to a usual mode of procedure, where the parts to be assembled comprise a lined upper, a counter and an innersole, the counter is inserted beneath the lining of the upper at the heel, a last is placed within the upper, an innersole is placed upon the bottom of the last, and the upper and the counter are secured to the innersole, the latter operation being commonly performed by driving a tack through the upper, the counter and the innersole at the extreme rear of the heel.

In the operation of assembling as heretofore practised, all of the steps above enumerated have been performed by hand.

The primary object of this invention is to provide a practically operative machine for use in assembling parts of boots or shoes, and to this end my invention contemplates the production of a machine for securing parts of boots or shoes in assembled relation preliminary to pulling-over their uppers. I believe that I am the first to devise a machine adapted for use before pulling-over, having means for securing parts of a boot or shoe together in suitable form for the pulling-over and the lasting operations.

My invention accordingly consists primarily in a machine for use at this point in the manufacture of boots or shoes, having provision for securing parts of a boot or shoe together in assembled relation. I have also disclosed herein a novel method of assembling said parts, which is not restricted for its advantageous employment to machines or mechanism for performing its several steps, but is of more general application. This method is not claimed herein but forms the subject of a separate application for Letters Patent filed October 26, 1907, Ser. No. 399,316.

A machine embodying the present invention is preferably constructed to operate upon parts of a boot or a shoe arranged about a last. The parts to be assembled may be loosely arranged by hand about the last, or if desired some of the parts may be secured to the last and the remainder arranged loosely about the last. In either case the operation of adjusting the parts into proper relative position is completed by the machine, and thereafter mechanism constituting a working part of the machine secures them together.

The present invention will be hereinafter described with reference to assembling a counter, lined upper and innersole. It is particularly important in assembling such parts of a boot or shoe preliminary to pulling-over and lasting that the counter be brought into close relation to the end edge of the innersole, before it is secured to the innersole. Ordinarily the rear of a counter remains throughout the manufacture of a shoe in substantially the relation to the rear end edge of the innersole which is given it in assembling. Should the counter in assembling be improperly positioned with relation to the end edge of the innersole, as frequently occurs in assembling such parts by hand, it will ordinarily not be brought into proper relation thereto in lasting. Consequently a shoe which has been improperly assembled in this way is found when completed to be defective, both the appearance and durability of its heel portion being impaired.

An important feature of the invention herein disclosed comprises mechanism whereby the counter is brought into close relation to the end edge of the innersole before being secured to the innersole. This mechanism may conveniently include means for pressing a counter against the end of the last upon which it is arranged and for holding the counter in close contact with the end of the last adjacent to the last bottom. It will be seen that with the innersole positioned correctly upon the bottom of the last, the counter will then be in close relation to the end edge of the innersole. Mechanism is preferably provided for securing the counter to the innersole, as herein shown said mechanism being arranged to insert a fastening automatically in these parts while they are held in proper relation.

In some kinds of shoes, particularly in the better grades known as welt shoes, it is desirable to secure the parts of the shoe at the rear end of the counter portion by driving a fastening through the upper, counter and lining into the rear end of the last. In order that the parts of the shoe may be so secured when desired by the machine of this invention, another important feature of the invention comprises mechanism for securing the parts of the shoe upper to the rear end of the last.

Preferably means is provided for moving the innersole longitudinally of the last upon which it is sustained, said means being so constructed that if the innersole is positioned initially too far forwardly, it will be moved rearwardly. In the operation of the machine rearward movement of the innersole is limited by the counter held against the end of the last. In some classes of work, however, the innersole is preferably tacked in position on the sole of the last, before the work is presented to the machine.

In the particular embodiment of the invention herein illustrated a last-supporter is provided which is arranged for movement in the direction of the length of the last carried thereby. The last-supporter is also movable in a direction approximately perpendicular to the bottom of the last so that the last bottom may be held against a stop which clamps the innersole upon the last, in the event that it is loosely mounted upon the last. A movably mounted carrier is arranged to be moved longitudinally of the last, and is provided with a wiper for bending over the upper at the end of the last and for pressing the counter down upon the innersole. Said carrier is provided also with a presser for engaging the rear of the upper at the innersole, said presser serving to press the upper and counter against the end of the last at this point, and coöperating with the wiper to form a well defined edge at the rear of the shoe. It is desirable that a machine for assembling parts of boots and shoes, having provision for securing said parts together at the heel, be so constructed as to facilitate as far as may be practical the subsequent operation of lasting the heel part of the boot or shoe. To this end, the wiper and presser herein shown are arranged to work the upper into close relation to the last at the extreme rear of the heel so that in the operation of the machine this portion of the boot or shoe is in effect partially lasted in performing the assembling operation.

The presser is normally out of contact with the work, and in the forward movement of the carrier imparts an impulse to the rear of the last, which tends to move the last forwardly. The innersole being engaged by the stop above referred to, which tends to hold the innersole against movement with the last, the last and innersole are moved relatively to bring the rear end of the innersole into close relation to the counter. Said carrier also supports suitably arranged fastening-inserting mechanism which is automatically actuated at substantially the end of the forward movement of the carrier, to drive one or more fastenings through the upper, counter and innersole at the rear end of the last.

In pressing the counter against the rear end of the last or upon the bottom of the last at the rear end there is ordinarily a tendency to spread the ends of the counter and move them down below the side edges of the innersole toward the cone of the last. This displacement is disadvantageous, more particularly because of the necessity imposed upon the laster of raising said ends into position above the innersole before lasting.

A novel feature of the present machine consists in means for holding the ends of the counter from downward movement past the side edges of the innersole while the parts of the shoe are being acted upon at the rear end of the last. This means may conveniently comprise a plurality of fingers standing normally apart and arranged to lie upon opposite sides of the last when the last is brought against the stop above referred to. The fingers are preferably arranged to be moved against the sides of the last automatically after the last supporter has been actuated to press the last against the stop and said fingers engage the upper adjacent to the ends of the counter, and are yieldingly and independently held against the sides of the last, so that variations in width or shape of the last are automatically provided for. The fingers are moved into engagement with the upper before the wiper and presser engage the work, so that the latter devices may not spread the ends of the counter. In the machine shown the arrangement is such that the work may be placed upon the last supporter at a point removed from the work engaging devices above referred to. The last-supporter may then be moved by hand in the direction of the length of the last to bring the heel end of the last against a stationary rest. The machine is then started by actuating a treadle, and the last supporter is automatically moved vertically to clamp the innersole yieldingly between the stop above referred to, and the last bottom. The remaining devices of the machine then act automatically to position in proper relation the parts to be assembled, and to secure them together, and thereafter the last supporter is automatically lowered to remove the innersole from contact with the stop and to permit the last supporter to be moved away from the stationary rest.

To secure the parts of the shoe upper to the rear end of the last, an important object of which is to prevent lateral displacement of the seam at the rear of the shoe during the pulling-over operation, the machine herein described is provided with means for inserting a tack in said rear end of the last, while the work is in operative relation to the mechanism for securing together counter and innersole. The arrangement shown comprises a tack driving mechanism which is constructed to operate through the stationary rest against which the rear end of the last is held, said mechanism being automatically actuated while the last is held against the stop above referred to, and being preferably arranged to drive the tack before the wiper has exerted any considerable action upon the work.

The end tack is preferably inserted before the wiper has reached the point in its movement where it tends to draw the upper over the edge of the last, so that the upper is held by said tack adjacent to the cone of the last and is drawn closely against the last by the wiper between said tack and the upper tack. Preferably also the end tack is driven after the wiper has advanced part way in its forward movement. This is particularly desirable where molded counters are used, since the flanges of such counters are pressed into close relation to the innersole by the wiper and it is desirable that the upper and counter be not secured to the last until the counter has been pressed down into its proper position.

In some classes of work, more particularly in making Oxford shoes and especially in Oxfords in which the upper is quite thin and flexible, it is desirable that the tack driven through the upper and the counter into the end of the last be inserted at a point closely adjacent to the cone of the last, in order effectually to prevent displacement of the rear seam during the pulling-over operation. As will be obvious, the end tack coöperates with that driven through upper and counter into the innersole to hold securely from displacement the portion of the upper lying between them and by placing the end tack as close to the cone of the last as possible the rear seam is effectually held from displacement. To provide for variations in height of lasts, and allow the end tack to be inserted, if desired, closely adjacent to the cone of the last, the present machine includes provision whereby the point in the height of the rear seam at which said tack is driven may be varied. In the construction shown, the rest above referred to and the tack driving mechanism operating therethrough are arranged for adjustment to permit the distance to be varied between said devices and the stop which controls the position of the sole of the last.

Other features of the invention will be hereinafter described.

Figure 2:
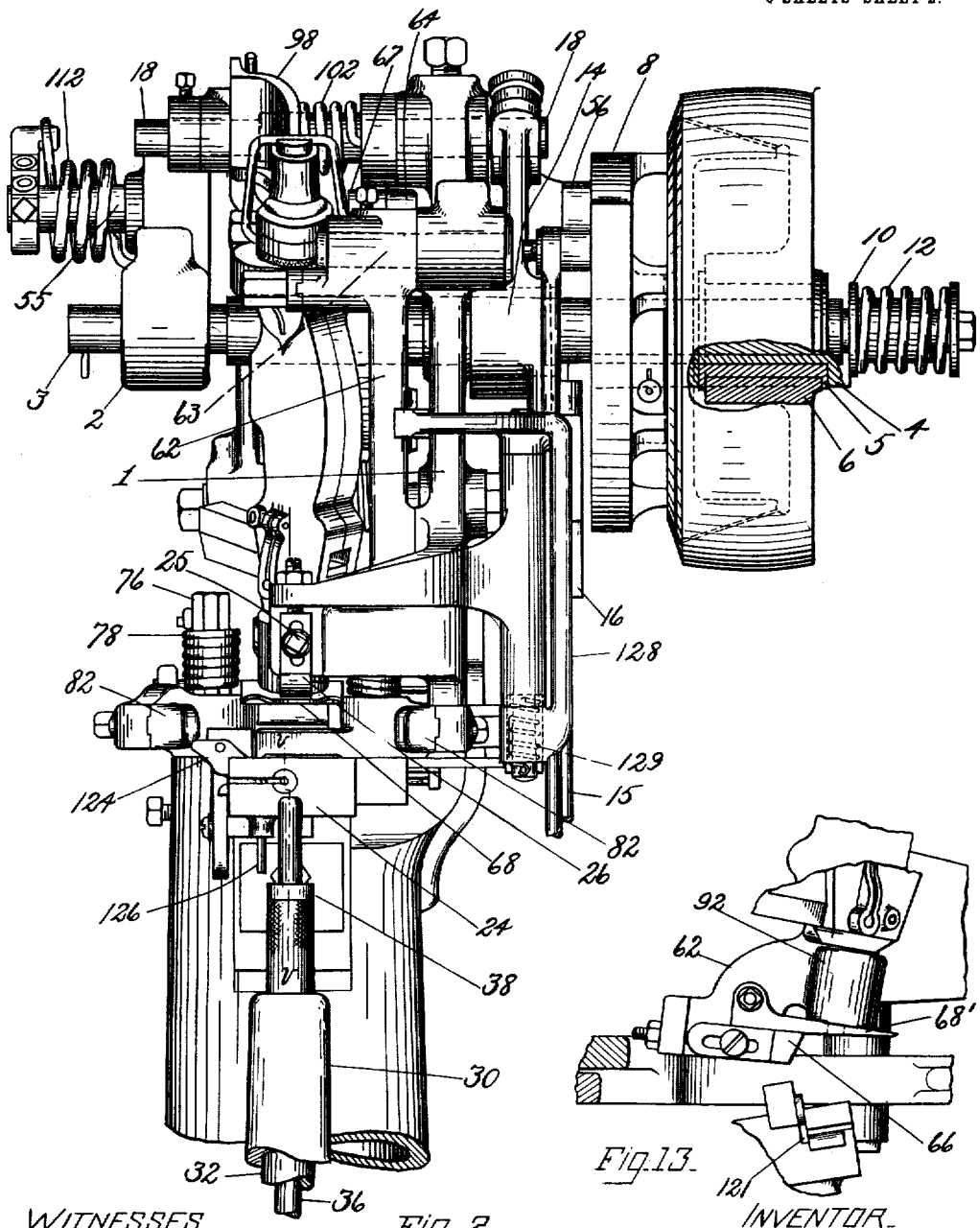
Figure 3:
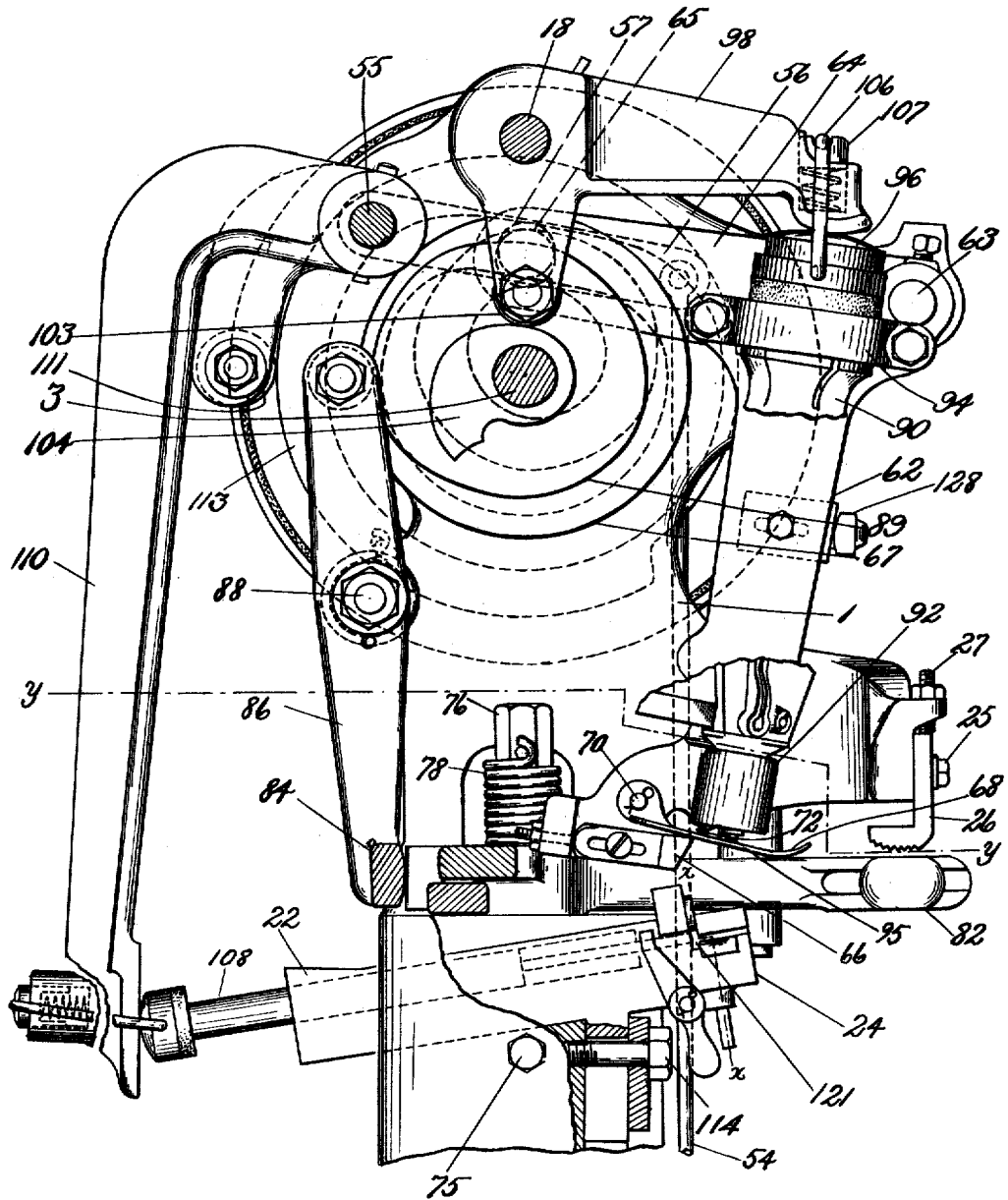
Figure 8:
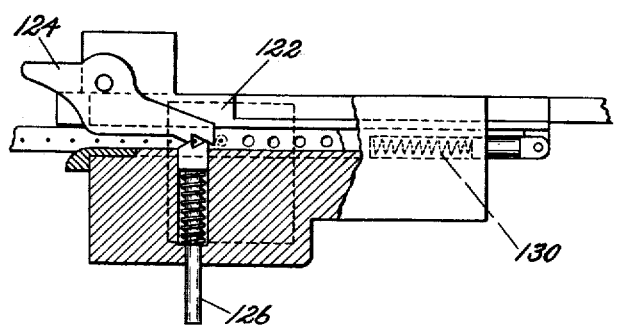
Figure 12:
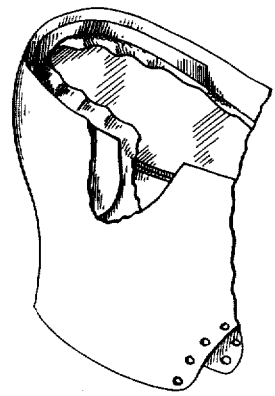
Figure 11:
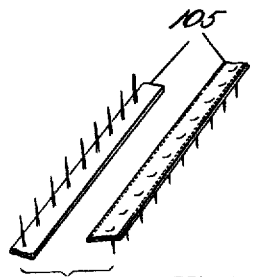
Figures 9, 10:
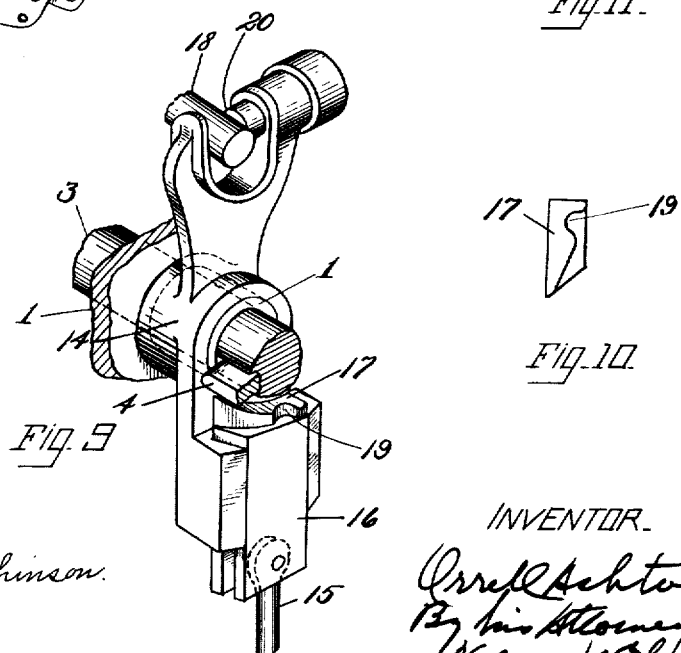

In the drawings,—Figure 1 is a view in side elevation of the more important parts of a machine embodying the invention; Fig. 2 is a view in front elevation of the upper portion of said machine; Fig. 3 is a view partly in vertical section and partly in side elevation of the machine; Fig. 4 is a view in horizontal section on the line $y$—$y$ of Fig. 3; Fig. 5 is a perspective view of a portion of the machine; Fig. 6 is a view in vertical section on the line $v$—$v$ of Fig. 2; Fig. 7 shows a shoe after being acted upon by the machine; Fig. 8 is a view on the line $x$—$x$ of Fig. 3; Fig. 9 is a perspective view of a detail; Fig. 10 is a view in plan of a part of the clutch mechanism; Fig. 11 shows a tack strip; Fig. 12 shows a shoe provided with a straight counter before being acted upon by the machine; Fig. 13 is a view illustrating a modified form of wiper.

In the machine shown on the drawings constituting the present embodiment of the invention, a vertical web 1 is formed upon the upper part of the machine frame. The web 1 is provided with a lateral extension 2 and a horizontal shaft 3 is mounted to rotate in bearings formed respectively in the extension 2 and web 1. Adjacent to one end of the shaft 3 said shaft is provided with a key way in which a key 4 is arranged to slide longitudinally of the shaft. The key 4 is provided intermediate its ends with a slot in which is received a collar 5. A pulley 6 is mounted on the collar 5 to rotate freely thereon but is held from movement longitudinally thereof. A member 8 is held upon and in fixed relation to the shaft 3 and is provided with a friction surface arranged to be engaged by a corresponding surface upon the interior of the pulley 6 when said pulley is forced toward said member 8. The pulley 6 moves longitudinally with the key 4. The key 4 is engaged by a sleeve 10 upon the shaft 3 which is forced toward the member 8 by a spring 12 surrounding said sleeve and arranged between a flange on said sleeve and a flange on the shaft 3. A lever 14 is formed with a hub arranged about the shaft 3, said lever being mounted upon an extension of the web 1 as clearly shown in Fig. 9, and said lever 14 is provided at its lower end with a guideway for a slide 16. The path of the slide 16 is in line with the inner end of the key 4, and said slide is provided at its upper end with a dog 17 having an inclined face to be engaged by the end of the key 4 in the rotation of the shaft 3 and force said key longitudinally of said shaft against the resistance of the spring 12, thus moving the pulley 6 away from the member 8. At the end of the curved part of the dog 17 a notch 19 is provided against the wall of which the key strikes, thus serving to positively arrest the shaft 3. The lever 14 is preferably capable of a slight oscillation upon its support its movement being limited by a stationary horizontal stud 18 secured to the vertical web 1.

One end of the stud 18 enters a slot in the upper end of the lever 14, as shown in Fig. 9. A plug 20 carried by the lever 14 and held outwardly by a spring (not shown) yieldingly engages the stud 18 in the movement imparted to the lever 14 by the key 4, and thus serves to yieldingly arrest said key. The slide 16 is controlled by a treadle rod 15 which may conveniently be held upwardly by a spring, and depressed by the operator when it is desired to start the machine. Upon depressing the dog 17 out of engagement with the key 4, said key is free to be moved to the left in Fig. 2 by the spring 12, and the member 8 and pulley 6 are accordingly brought into effective relation. It will be seen that as long as the treadle is kept depressed, the shaft 3 will continue to rotate and that when the dog 17 is allowed to rise into the path of the key 4 the parts are yieldingly arrested at a predetermined point.

Below the shaft 3, the machine frame is provided with a horizontal table 21, having a groove in its upper face extending from front to rear of the machine. In this groove is supported a stem 22 having at its front end a rest 24 arranged to receive against its acting face the heel end of a shoe. A stop 26 to bear on the sole of the shoe is mounted upon a lateral extension of the web 1 in position to bring its effective part in advance of the rest 24. The lower or acting face of the stop 26 is provided with transverse corrugations, and the stop is preferably held in vertically adjustable position by suitable clamping means such as a clamping bolt 25 passing through a slot in said stop into the web 1. An adjusting screw 27 engages the end of the stop 26.

A bracket provided with a horizontal guideway 28 is formed upon the machine frame below the rest 24 and stop 26. A post 30 is mounted to slide horizontally upon this guideway, and is provided with a vertical bore to receive a sleeve 32. The sleeve 32 is vertically adjustable and is fixed in position by a spring pressed pin 34 arranged to enter any one of a plurality of sockets arranged at intervals longitudinally of the sleeve 32 as shown in Fig. 1. A rod 36 formed at its upper end to constitute a heel pin for a last is mounted within the sleeve, and its downward movement is limited by a collar 38 formed upon it, arranged to engage the upper end of the sleeve 32. The adjustment permitted the sleeve 32 allows the position of the upper end of the rod 36 or last supporter to be varied, for example to accommodate different heights of lasts. The rod 36 is provided at its lower end with a removable head 40. A lever 42 pivoted upon a stud 44 upon the machine frame is arranged to engage the head 40. A coiled spring 46 arranged about the stud 44 bears at one of its ends upon the lever 42 and at the other end upon a pin carried by a disk 47, which is secured in rotatably adjustable position by a pin 48 adapted to enter any one of a series of sockets in the disk 47. The spring 46 tends to move the lever 42 upwardly by a tension which may be varied as desired. It will be seen that the yielding actuation of the last-supporter provides for slight variations in height of the last, and also controls the pressure with which the innersole is pressed upon the last by the stop 26.

A rod 54 is connected at its upper end to a lever 56 pivoted upon a horizontal stud 55 secured to the web 1, said lever being provided with a roller 57 working in a cam groove in the member 8. The lower end of the rod 54 is inserted in an orifice in the lever 42 and is provided with a sleeve 58, between which and the lever 42 is arranged a coiled spring 60. The sleeve 58 is adjustable vertically upon the rod 54. The rod 54 is normally in a depressed position, in which the lever 42 is held down and the heel pin in its lowermost position. Upon the rod 54 being automatically raised the spring 46 raises the heel pin yieldingly into operative position, holding the sole against the stop 26. As will be obvious the vertical adjustment permitted the stop 26 allows the height at which the last is held to be varied, so that the heel part of the last may be sustained in proper relation to the presser and the wiper hereinafter described.

Two approximately L-shaped levers 74 are pivoted upon the table 21 at opposite sides of the stem 22, upon pins 76. The pins 76 are mounted for rotative turning movement in said table 21, and are held in fixed position by clamping bolts 75. Said pins are encircled by coil springs 78, the lower ends of which bear against lugs upon said levers 74, as clearly shown in Fig. 4, and the upper ends of which bear upon said studs 76. The springs 78 act independently of each other to move the forward ends of the levers 74 against the sides of the work. Each lever or finger 74 carries at its forward end a work engaging member 82, secured to said lever by a screw 83 passing through a slot in said lever, thus permitting adjustment of the member longitudinally of said lever. The rear ends of the levers 74 cross each other, as shown in Fig. 4, and are engaged by a member 84 formed upon the lower end of a lever 86 pivoted upon a horizontal stud 88 secured to the web 1. Said lever 86 is provided with a roller at its upper end arranged to be engaged by a cam 89 upon the shaft 3, as shown in Fig. 3. The member 84 is moved automatically out of contact with the levers 74 at a predetermined point in the cycle of the machine and allows the work engaging members 82 to be moved together by the springs 78, against the work at points adjacent to the corners of the counter. It will be seen that the members 82 are independently and yieldingly held against the work by the springs 78. This is of advantage in that variation in width or shape of the last is automatically provided for.
A carrier 62 for devices to be described is provided with a pivot 63 journaled in the web 1 at a point above and in front of the rest 24. An arm 64 upon the carrier is provided with a roller 65 arranged to work in a cam groove formed in the face of a disk 67 upon the shaft 3, to actuate the carrier positively. The lower end of the carrier in its forward movement moves downwardly in a curved path longitudinally of the last.
A rigid presser 66 is carried at its lower end, which may have an acting face concaved slightly in horizontal section. Said face is preferably arranged at an inclination so that it will conform approximately to the inclination of the last at the rear near the sole when it comes into contact with the work, as shown in Fig. 6. The presser is fixed upon the carrier 62 in adjustable position so that it may be adjusted forwardly or rearwardly upon the carrier.

A wiper 68 is mounted upon the carrier above the presser 66, said wiper being pivoted at its rear end upon a pin 70. A spring 72 arranged between said wiper and a part of the carrier 62 holds said wiper yieldingly downwardly. The wiper 68 has its forward end curved upwardly to ride over the work more easily, and its forward edge is somewhat crescent shaped in plan view.
It frequently happens that the rear seam of an upper such as that shown in Fig. 7, does not extend quite to the heel seat edge of the upper so that a slit is left in this edge at the extreme rear. The crescent or concave shape of the wiper 68 is of advantage in preventing the tack driving mechanism hereinafter described from driving a tack through this slit and consequently failing to secure the upper to the innersole.
It will be seen that when thus formed the wiper in moving over the work tends to gather toward the longitudinal central line of the last the portion of upper acted upon.

Upon the carrier 62 is mounted tack driving mechanism comprising a casing 90 having its lower end supported in and extending through a block 92 upon said carrier and its upper end embraced by a strap 94 upon the carrier. A driver bar 95 is arranged within the casing, and is provided at its upper end with a head 96 arranged to be engaged by the outer end of a lever 98 pivoted upon the stud 18. A coiled spring 102 encircling said stud bears at one end on the lever 98 and is connected at its other end to the stud, said spring acting to force the forward end of the lever 98 downwardly. The lever 98 has a downwardly extending arm provided with a roller 103 arranged to be engaged by a cam 104 on the shaft 3, whereby upon the rotation of the shaft 3 the lever 98 is lifted against the resistance of the spring 102, and allowed to suddenly descend, to force the driver bar downwardly and drive a tack into the work.
A yoke 106 is pivoted to the head of the driver bar and is arranged over the end of the lever 98 so that relative movement of said head and lever may be permitted in the movement of the carrier 62 longitudinally of the last. The end of the lever 98 may conveniently be provided with a vertical socket to receive a yieldingly sustained plunger 107, the yoke 106 engaging a notch in the upper end of the plunger. A tack strip 105 such as shown in Fig. 11 is intermittently fed through a passage 109 transversely to the path of the driver bar to supply tacks to the driver passage. The particular mechanism employed for advancing this tack strip is well known in the art and need not be herein described. The lower end of the driver casing 90 is in line with an orifice in the wiper 68 to permit the tack to be driven therethrough.
The stem 22 is provided with a longitudinally arranged driver passage, terminating in the face of the rest 24. A driver bar 108 is arranged to work in said passage, and the passage is so positioned as to permit a tack to be driven into the work at the rear at a point removed from the sole, for example at the point indicated in Fig. 7. The arrangement of the parts is preferably such that this tack is partially inserted by the driver, so that the tack projects from the last in position to be conveniently removed after lasting. The rest 24 and the driving mechanism operating therein are vertically adjustable in order to vary the position of the tack driven into the end of the last. According to the construction shown the stem 22 is provided with a depending slotted extension arranged for vertical movement in a guideway formed in the frame and a bolt 114 is arranged in the slot to hold the stem adjustably in fixed position. The vertical adjustment of which the stem 22 is capable permits the end tack to be driven if desired closely adjacent to the cone of the last, whatever variation there may be in the height of the last.

The arrangement of the parts is preferably such that the tack driven by the driver bar 108 is either perpendicular to the surface in which it is driven or is inclined toward the sole of the last. Accordingly in the construction shown the stem 22 and its driver passage are inclined upwardly and forwardly. The feature of driving the tack obliquely toward the sole of the last is of advantage in that the tendency to upward movement of the upper produced by the wiper in moving over the edge of the last tends to draw the upper closely against the last in the vicinity of a tack thus inserted in the end of the last. It will be obvious from Fig. 6 that if the tack were otherwise arranged this effect might not be secured, for example if the tack were inclined in the reverse direction, i. e. toward the cone of the last the upward movement of the upper would tend to cause it to be moved away from the last end in the vicinity of the tack. This feature is also of advantage in that the driving of the tack tends to hold the last upwardly against the action of the wiper. The driver bar 108 is provided with a head arranged to be engaged by a lever 110 secured to the horizontal shaft 55 mounted in the frame and encircled by a coiled spring 112 arranged to move the driver bar forwardly. The lever 110 is provided with a roller 111 engaged by a cam 113 upon the shaft 3 for moving the driver bar rearwardly. The lever 110 may be connected to the head of the driver bar by a yoke pivoted to the head and passing over a spring pressed plunger upon said lever, such as has been above described in connection with the vertically arranged driving mechanism.

A tack strip 105 is intermittently fed transversely to the path of the driver bar 108 in position to deliver tacks into the path of the driver. A conduit 121 for the tack strip is arranged at the forward end of the stem 22, and a slide 122 provided with a feed pawl 124 to engage the tack strip, is arranged to move in a direction parallel to said conduit. A retaining pawl 126 is arranged in the stem 22 beneath the strip as clearly shown in Fig. 8.

The slide 122 is actuated in one direction by a lever 128 pivotally mounted upon a lateral extension of the web 1, said lever having a lower member arranged to engage the end of the slide 122, as shown in Fig. 4, and an upper member arranged to be engaged by the carrier 62 in its forward movement, as shown in Figs. 2 and 3. A spring 129 holds the lever 128 in engagement with the carrier 62. As will be obvious, in the forward movement of the carrier 62, the slide 122 is moved to the left in Fig. 8 together with the feed pawl 124. A spring 130 moves the slide 122 in the reverse direction to feed the tack strip. The slide 122 is provided with a vertical slot 132 in its rear face and a latch 134 is pivoted upon the rest 24 in such position that it may be moved into said slot to hold the slide 122 to the left in Fig. 4. This permits this tack feeding mechanism to be rendered ineffective when desired.

Preparatory to use of the machine shown and above described the parts of the boot or shoe to be assembled are arranged upon a last. It will be understood that the manner of arranging said parts may vary according to the grade of work or other circumstances. In some grades of work, particularly in making welt shoes, the innersole is commonly tacked to the last bottom prior to assembling. Where other grades such as McKay shoes are made, the innersole is commonly loosely sustained upon the last bottom throughout the assembling operation. In bringing the parts of the boot or shoe together, the counter is inserted by hand in position within the upper, for example between the upper and its lining, the last is placed inside the upper and in the event that the innersole has not been before tacked to the last bottom, it is placed loosely upon said last bottom. Where a molded counter is employed the flange of the counter lies above the face of the innersole as shown in Fig. 5. In case a straight or unmolded counter is used, such as that shown in Fig. 12, in placing it within the upper it is positioned so that when the upper is placed upon the last the edge of the counter will project above the edge of the innersole, this upwardly projecting portion being subsequently bent or wiped down upon the innersole. It will be understood that the straight counters are in temper when used, so that they may readily conform to the shape of the end of the last, and so that their upper edges may be bent over as stated. It is a common practice to secure a straight counter throughout its length to the upper lining by means of adhesive material when said counter is placed within the upper. As will be obvious this insures that the counter will remain in the position which is given it within the upper.

The parts of a boot or shoe having been brought together upon a last, the last is placed upon the heel pin of the machine shown, and may be then moved by hand rearwardly against the rest 24. If desired, the subsequent vertical movement of the heel pin may be depended upon to raise the work against the stop 26. It is preferred ordinarily however, to hold the work manually against the stop 26 and rest 24 before the machine is started, since thereby the position of the work with relation to the remaining work engaging devices may be manually controlled. This is of advantage in securing an accurate location of the work with relation to said devices before they engage the work. The heel pin ordinarily does not fit accurately the pin hole of the last, and hence a slight longitudinal or lateral tilting movement of the last upon the heel pin is commonly possible. By positioning the last initially by hand, liability of the last assuming an improper position with relation to the work engaging devices is prevented. It may be found desirable to hold the last against the stop and rest with its bottom slightly inclined downwardly and rearwardly, in order to present the last to the wiper and presser in the most advantageous position.

The last having been placed upon the heel pin in the manner desired, the machine is started by the depression of the treadle. The movement of the main shaft 3 first raises the heel pin upwardly, and if the last has not been initially brought against the stop 26, it is moved vertically by said heel pin between the work engaging members 82, until the sole strikes the stop 26, the work remaining in contact with the rest 24 in its vertical movement and being raised into a predetermined position by the heel pin. If the last has been initially brought against the stop 26, the heel pin is merely moved vertically in the last pin hole. In either case, the heel pin finally holds the last yieldingly against the stop 26. In further movement of the main shaft the work engaging members 82 are moved automatically against the upper at points adjacent to the ends or corners of the counter. The ends of the counter are thus brought against the sides of the last, and are held against the last and the side edges of the innersole until the parts are secured together. Where the innersole is not secured to the last bottom, the members 82 have also a tendency to position the innersole laterally of said last bottom.

While the counter is held at the corners, the carrier 62 moves forwardly longitudinally of the last, bringing the wiper 68 and presser 66 successively into engagement with the work. The wiper bends over the upwardly projecting edge of the upper at the heel, presses it down upon the innersole and tends to draw the upper into close proximity to the last at the rear. When a straight counter is used the wiper also bends over the edge of the counter at the rear of the last, and presses it upon the innersole. In the use of a flanged counter the wiper presses the flange upon the innersole, and thus positions the counter with respect to the height of the last. When the wiper engages the upwardly projecting portion of the upper or counter, said wiper is permitted upward yielding movement against the resistance of the spring 72. During the latter portion of the forward movement of the wiper, however, it is pressed unyieldingly upon the work since at this time the wiper bears upon the lower face of the carrier 62 on account of the forward movement of the wiper in a path inclined downwardly toward the work. As will be obvious this feature facilitates the production of a well defined edge at the rear of the shoe.

Before the end of the forward movement of the wiper and preferably before the wiper has reached the point in its movement at which it tends to strain the upper over the edge of the last, the lower driver bar drives a tack into the rear end of the last. The upper is thus held at the rear end of the last while the wiper completes its forward movement, and said upper is thus drawn closely against the last between the lower tack and the point where the upper tack is driven into the innersole.

The presser 66 engages the rear of the upper near the innersole preferably just before the end of the forward movement of the carrier. The presser forces the upper and the counter closely against the last at the rear adjacent to the sole, and coöperates with the wiper to form a well defined edge at the rear of the upper. The acting face of the presser is arranged so that as it strikes the work it will rest evenly against the end of the last and thus force the upper and counter into close relation to the rear of the last adjacent to the last bottom.

It will be seen that the presser imparts an impulse to the last in a forward direction. The corrugated lower face of the stop 26 against which the last is held, tends to prevent forward movement of the innersole, and consequently the impulse of the presser moves the last and innersole relatively to shift the innersole rearwardly upon the last. Where the innersole is tacked to the last, little if any rearward movement of the innersole upon the last is permitted, but where the innersole is loose upon the last this feature is particularly advantageous in shifting the innersole rearwardly in case it has been positioned by the operator too far forward. The rear end edge of the innersole is thereby brought closely against the counter, the counter limiting rearward movement of said innersole.

It will be understood that in the machine herein shown, the last is held by the operator against the rest 24 while the parts are being brought into assembled relation by the machine. It may be found desirable to provide means for yieldingly holding the last from forward movement, so that the operator may be partially relieved of the necessity of pressing the last against the rest. I have accordingly shown herein one arrangement for securing this result consisting in providing the forward end of the lever 42 with an inclined face arranged for engagement with the last supporter. It will be seen from Fig. 1 that in the operative position of the last in contact with the rest 24 and stop 26, forward movement of the last supporter is retarded by the inclined face of the lever 42.

After the parts of the boot or shoe have been brought into assembled relation as above described and while they are held in said relation, the driver bar 95 automatically descends in the casing 90 to drive a tack into the work through an orifice in the wiper. This occurs at approximately the end of the forward movement of the carrier. The casing 90 is arranged upon the carrier a predetermined distance forwardly of the presser 66, and as the presser has been brought against the heel of the last before the tack is driven by the driver bar 95, it will be seen that the presser acts as a gage to control the position at which the tack is driven. As will be obvious the adjustment permitted the presser allows the tack to be driven at a greater or less distance from the edge of the last. The tack is preferably driven through the upper, the counter and the innersole and is clenched upon the heel plate of the last. It would be within the present invention to insert simultaneously a plurality of tacks for example upon opposite sides of a rear seam.

After the upper tack is driven, the heel pin is automatically depressed, the other automatic parts of the machine assume their initial position and the last may be removed from the machine. It will be observed that the entire cycle of operation of the machine shown is performed in a single revolution of the main shaft. If desired a plurality of tacks may be successively inserted in the end and in the sole of the shoe by successive depressions of the treadle while the last remains in position. Since the end of the last may be moved laterally by moving the last upon its pivot, said tacks may be spaced laterally from each other, by shifting the last slightly between successive operations.

The devices acting upon the work at the heel and more particularly the wiper and presser, tend to spread apart and move the ends of the counter downwardly toward the cone of the last. This is objectionable on account of the necessity of bringing the counter ends back into position before lasting. It is particularly disadvantageous where a flanged counter is used since if the corners of such counters are depressed below the edge of the innersole, they cannot be brought back into position by the laster except at the expense of some trouble. It will be borne in mind that the flanged or molded counters are quite stiff and if the flanges of such counters are caught at their ends, below the side edge of the innersole, they must be manually raised before lasting, in order that the counter may be brought closely against the sides of the last. An important function of the work engaging members 82 is to prevent the ends of the counter being moved downwardly below the edge of the innersole. In the machine shown, this is accomplished by holding the ends of the counter against the sides of the last, but it will be obvious that the result desired may be secured in other ways.

An important advantage resulting from the use of the present machine is that the heel seat may be in effect partially lasted, so that the work of the laster is facilitated. The wiper and presser coöperate to bring the upper into close contact with the last and to form a well defined edge at the rear of the heel seat, so that in lasting the operator starts with a heel seat in considerably better shape than is commonly produced in assembling by hand. He is thereby enabled to form better heel seats and also to produce them with less effort.

It will of course be understood that all of the features embodied in the machine shown need not be employed. For example, the mechanism above described for driving the lower tack may be dispensed with where the insertion of the lower tack is not desired. In the machine shown however, the feeding of the lower tack strip may be prevented if desired by the latch 134. It is preferred for the reasons above stated, to drive the lower tack prior to driving the upper tack, but it would be within the present invention to drive these tacks simultaneously or in the reverse order if desired.

I have illustrated in Fig. 13 a modified arrangement in which a wiper is rigidly secured to the carrier 62. As will be apparent from said figure the wiper 68' is secured in fixed position upon the carrier, bearing against the lower face of the block 92 and being provided with a perforation to permit the driver 95 to operate therethrough. Said wiper diminishes gradually in thickness toward its forward edge and is arranged so that its lower face is in line with the upper edge of the presser. It will be observed that in the use of this form of wiper the rear edge of the shoe is shaped or molded into substantial conformity with the meeting faces of wiper and presser.

Having described my invention, what I claim as new and desire to secure by Letters Patent of the United States is:—

1. A machine for assembling an upper, a counter and a sole, having in combination means for adjusting relatively said upper, counter and sole and means for securing said upper, counter and sole together at the heel.

2. A machine for operating upon parts of boots or shoes arranged upon a last having in combination means for automatically moving an innersole rearwardly upon the last and for automatically pressing a counter against the end of the last and means for securing the counter to the innersole.

3. A machine for assembling parts of boots or shoes upon a last having in combination means for automatically moving an innersole rearwardly upon the last and for automatically pressing a counter against the end of the last, and means for automatically securing the counter to the innersole.

4. A machine for assembling parts of boots or shoes upon a last having in combination means for supporting the last and means for automatically moving an innersole rearwardly upon the last and for automatically pressing a counter against the end of the last.

5. A machine for securing a loosely arranged upper and counter to an innersole mounted upon a last preliminary to lasting, having in combination, means for moving said parts into assembled relation and means for automatically securing the upper and counter to the innersole at the extreme rear of the heel.

6. A machine of the character described having in combination means for yieldingly clamping an innersole upon a last, and means for applying an impulse to an end of the last, said two means being arranged for relative movement, whereby the innersole is moved longitudinally upon the last into close relation to an upper arranged upon the last, and means for yieldingly resisting longitudinal movement of the last.

7. In a machine of the class described, a rest arranged for engagement by the rear end of a last, means for sustaining the last in engagement with said rest and fastening inserting mechanism arranged to drive a fastening into the rear end of the last obliquely toward the sole of the last.

8. A machine of the character described having in combination a stop arranged for engagement by the bottom of a last, a last supporter arranged for movement toward the stop and arranged also for movement in the direction of the length of the last, and means for yieldingly moving said last supporter toward the stop constructed to resist movement of the last supporter in the direction of the length of the last.

9. A machine for assembling parts of boots or shoes arranged upon a last, having in combination, means for pressing a counter against the end of the last by pressure applied at the sole edge longitudinally of the last, means for holding the ends of the counter against the sides of the last, and means for securing the counter to the innersole at the rear of the heel.

10. The combination of a last supporter, means for wiping an upper over an innersole at the heel, means for securing the upper to the innersole and mechanism for securing the upper to the rear end of the last adjacent to the cone of the last, said mechanism being arranged for adjustment to accommodate lasts of different heights.

11. A machine for securing parts of boots or shoes, in assembled relation upon a last preliminary to lasting having in combination means for moving said parts into assembled relation at the heel and means for securing said parts together by one or more fasteners inserted at the extreme rear of the heel.

12. A machine for securing parts of boots or shoes in assembled relation preliminary to lasting, having in combination, means for automatically pressing a counter mounted loosely upon a last into close relation to the end of an innersole arranged upon the last and means constructed for securing the counter to the innersole at a predetermined distance from the edge of the last.

13. A machine for operating upon parts arranged upon a last having in combination means for moving an innersole rearwardly upon the last and for pressing a counter against the end of the last, and means for securing the counter to the innersole.

14. A machine for securing in assembled relation parts of boots and shoes, having in combination, automatic means for holding a counter in close relation to the end of a last by pressure applied to said counter at the sole edge and for pressing said counter upon the face of an innersole mounted upon the last, and automatically controlled means for securing the counter to the innersole at a predetermined distance from the edge of the innersole.

15. An assembling machine, having in combination a last supporter, a device for frictionally engaging the face of an innersole sustained upon the last, said last supporter being arranged for movement in the direction of the length of the last, a presser for engaging a counter loosely sustained upon the last, said device and said presser arranged for relative movement, and means for applying pressure longitudinally of the last through said presser to the counter whereby the counter and innersole are moved relatively into close engagement.

16. A machine of the class described having in combination means for adjusting an innersole longitudinally upon a last, and for pressing a counter against the end of the last, and automatic means for thereafter securing the counter to the innersole.

17. A machine of the character described, having in combination, means for yieldingly clamping an innersole upon the sole of a last, and mechanism for applying an impulse to the rear end of the last in the direction of the toe whereby the innersole is adjusted rearwardly upon the last into close relation to a counter sustained upon the last, said mechanism being arranged to have engagement with the rear end of the last at the sole edge of the last.

18. A machine for securing in assembled relation an upper, counter and innersole mounted in loose relation upon a last, having in combination means for moving inwardly the ends of the counter against the sides of the last, means for holding the counter against the rear end of the last by pressure applied longitudinally of the last, means for wiping the upper over the counter and innersole and means for securing the upper to the innersole.

19. In a machine of the class described, a last supporter arranged for movement approximately in the direction of the length of the last and also for movement in a direction perpendicular to the sole of the last, means arranged for engagement with the sole of the last for limiting said last-named movement, a plurality of fingers arranged to have engagement with the opposite sides of the last adjacent to the ends of the counter, and means for pressing said fingers yieldingly against the sides of the last.

20. An assembling machine having in combination a movable last supporter, a rest for engaging the rear of the last, a stop arranged to be engaged by the bottom of the last, fastening-inserting mechanism arranged to operate upon the last held in engagement with said rest and stop, and means for automatically actuating the last supporter to press the last against said stop and for withdrawing the last from engagement therewith.

21. An assembling machine, having in combination, means for pressing the ends of a counter against the sides of a last, means for pressing the counter against the rear end of the last at the sole edge constructed to become effective after the ends of the counter have been moved into close relation to the sides of the last, and means for thereafter securing the counter to an innersole carried by the last.

22. A last supporter arranged for movement into and out of operative position in approximately the direction of the length of the last and formed to support a last for pivotal movement thereon, means for controlling the position of a last upon said supporter, an unyielding presser for engaging the rear end of the last at the sole edge arranged for movement longitudinally of the last, means for positively reciprocating said presser, and means for securing together the parts mounted upon the last during the reciprocation of said presser.

23. A last supporter arranged for movement into and out of operative position in approximately the direction of the length of the last and formed to support a last for pivotal movement, means for controlling the position of a last upon said supporter, a wiper for wiping an upper over the edge of the last at the rear arranged for movement longitudinally of the last, means for reciprocating said wiper and means for securing the wiped-over upper to an innersole carried by the last during the reciprocation of said wiper.

24. A machine for assembling parts of boots or shoes preliminary to lasting, having in combination automatic means for clamping an innersole on the bottom of a last, automatic means for pressing a counter against the end of the last, and automatic means for securing the counter to the innersole.

25. In a machine of the class described, a movable carrier, a wiper movably supported upon said carrier and arranged for movement over the edge of a last, means movable with the carrier for yieldingly pressing the wiper upon the work during the first portion of its movement over the edge of the last, and means upon the carrier for rigidly pressing said wiper upon the work during the latter part of said movement.

26. In a machine of the class described, a movable carrier, a wiper movably supported upon said carrier and arranged for movement over the edge of a last, in a path inclined toward the bottom of the last, means movable with the carrier for yieldingly pressing the wiper upon the last, and a stop upon the carrier for limiting yielding movement of said wiper at a point short of the end of its movement over the edge of the last.

27. A machine of the class described, having in combination, means for holding the ends of a flanged counter against the sides of a last, means for pressing the counter into assembled relation to the rear end of an innersole carried by the last constructed to become effective while the ends of the counter are held from outward movement relatively to the last, and means constructed for securing a predetermined portion of the flange of the counter to the innersole.

28. A machine for securing in assembled relation parts of boots or shoes, having in combination, means for pressing upon a last bottom a flanged counter loosely mounted upon a last, means for pressing the counter against the end of the last at the sole edge constructed to become effective after pressure has been applied to the counter toward the bottom of the last, and means for securing the counter to an innersole carried by the last.

29. An assembling machine having in combination automatic means for holding the ends of a flanged counter in juxtarelation to a last, automatic means for thereafter pressing the flange of the counter upon the last bottom, and means constructed for securing a predetermined portion of the flange to an innersole carried by the last.

30. A machine of the class described having in combination means for securing together an upper and an innersole sustained upon a last, and means for securing the upper to the rear end of the last.

31. A machine of the class described having in combination means for securing an upper to the rear end of a last, means for thereafter securing the upper to the heel part of an innersole mounted upon the last, and means for bringing said securing means successively into operation.

32. In a machine of the class described, a movable last supporter, a rest arranged to be engaged by the end of a last sustained upon said supporter, and fastening inserting mechanism arranged to operate through said rest and to drive a fastening into the last-end engaging said rest.

33. A plurality of fastening-inserting mechanisms, one of said mechanisms being normally removed from the work and arranged for movement into operative relation to the work, and means for supplying fastenings to a second mechanism controlled by the movement of the first mechanism.

34. A machine of the class described, having in combination means for securing an upper to the rear end of a last, means for thereafter straining the upper over the rear edge of the last, means for bringing said securing means and straining means successively into operation, and means for securing the strained upper to an innersole sustained upon the last.

35. A machine for operating upon parts of boots or shoes loosely arranged upon a last having in combination means for securing an upper to the last, means for thereafter adjusting the upper and an innersole into assembled relation, and means for securing said parts together.

36. A machine for assembling an upper, a molded counter and an innersole mounted upon a last having in combination means for pressing the flange of the counter upon the innersole and means for thereafter securing the counter to the rear end of the last.

37. A machine for assembling upon a last an upper, a counter and an innersole having in combination means for pressing the counter against the rear edge and the face of the innersole, and means for securing the counter to the rear end of the last.

38. A machine for assembling upon a last an upper, a counter and an innersole having in combination means for pressing the counter into engagement with the rear edge and the face of the innersole, means for securing the counter to the rear end of the last and means for thereafter securing the counter to the innersole.

39. A machine for assembling an upper, a molded counter and an innersole arranged about a last having in combination means for pressing the flange of the counter upon the innersole, means becoming operative after the counter has been pressed into engagement with the innersole for securing the counter to the rear end of the last, and means for thereafter securing the flange of the counter to the innersole.

40. In a machine of the class described, a rest arranged for engagement with the end of a last, means for sustaining the last in engagement with said rest and fastening inserting mechanism arranged to drive a fastener into said last at a point removed from the bottom of the last.

41. An assembling machine having in combination a last supporter, a stop arranged to be engaged by the last bottom, a rest for engagement by the end of the last, a carrier arranged for movement longitudinally of the last and provided with a wiper for riding over the edge of the last, a presser for engaging the end of the last adjacent to the last bottom and fastening-inserting mechanism for driving a fastening into the work engaged by the wiper, and a plurality of fingers arranged to engage opposite sides of the last adjacent to the ends of the counter prior to the forward movement of the carrier.

42. In a machine of the class described, a vertically movable last supporter, a stop arranged to be engaged by the last bottom, a rest for engagement by the end of the last, fastening-inserting mechanism arranged for operation through said rest, a carrier arranged for movement longitudinally of the last having a wiper for wiping over the rear edge of the upper and having provision for inserting a fastening in the portion of the upper engaged by the wiper.

43. An assembling machine having in combination a last supporter, means for automatically raising and depressing the last supporter, a stop arranged for engagement by the last bottom, a rest arranged for engagement by the end of the last, a carrier pivotally movable longitudinally of the last about a horizontal axis above and in advance of the rest, a wiper sustained by the carrier in position to ride over the rear edge of the last, and fastening-inserting mechanism mounted upon the carrier in position to insert a fastening in the portion of the work engaged by the wiper.

44. An assembling machine having in combination a last supporter, a stop having a corrugated face arranged for engagement by the last bottom, means for yieldingly actuating the last supporter to sustain the last in yielding engagement with said stop, a rest arranged to determine the position of the rear end of the last, a carrier pivotally movable longitudinally of the last about a horizontal axis above the last, a presser mounted upon the carrier in position to engage the rear of the work adjacent to the last bottom, means for automatically actuating said carrier, a plurality of fingers arranged to engage opposite sides of the last adjacent to the ends of the counter, and means for automatically bringing said fingers into engagement with the last prior to the engagement of the presser with the work and for moving them away from the last subsequently to said engagement.

45. A machine for assembling an upper, a counter and an innersole arranged in loose relation upon a last having in combination, means for pressing the counter against the rear end of the last at the sole edge, means for wiping the upper over the rear edge of the last, and means constructed for securing the upper and counter to the innersole at the rear end of the last while said upper and counter are held in close relation to the rear edge of the last.

46. The combination of means for securing an upper to the rear portion of an innersole arranged upon a last with mechanism for securing the upper to the rear end of the last at a predetermined point in the height of the last, said means and mechanism arranged for relative adjustment to accommodate lasts of different heights.

47. A machine for securing in assembled relation an upper, a counter and an innersole arranged in loose relation upon a last having in combination means for moving the upper and counter into close relation to the rear end of the last, means for moving the ends of the counter against the sides of the last, means for automatically pressing the upper and counter against the rear end of the last at the sole edge and automatically controlled means for securing the upper and counter to the innersole at its rear end.

48. A machine of the class described, having in combination, mechanism for inserting a fastening in a shoe, and means for maintaining the shoe relatively to said mechanism in position to receive a fastening in its rear face from said mechanism at a point removed from the sole.

In testimony whereof I have signed my name to this specification in the presence of two subscribing witnesses.

ORRELL ASHTON.

Witnesses:
BERNARD BARROWS,
ARTHUR L. RUSSELL.

---

Copies of this patent may be obtained for five cents each, by addressing the "Commissioner of Patents, Washington, D. C."